(No Model.) 2 Sheets—Sheet 1.

T. HILL.
CART.

No. 570,400. Patented Oct. 27, 1896.

WITNESSES:
Donn Twitchell
Geo. G. Hoskins

INVENTOR
T. Hill
BY
Munn & Co.
ATTORNEYS.

(No Model.)  2 Sheets—Sheet 2.

T. HILL.
CART.

No. 570,400. Patented Oct. 27, 1896.

WITNESSES:
Donn Twitchell
Theo. G. Hoster

INVENTOR
T. Hill
BY
Munn & Co.
ATTORNEYS.

UNITED STATES PATENT OFFICE.

THOMAS HILL, OF JERSEY CITY, NEW JERSEY.

CART.

SPECIFICATION forming part of Letters Patent No. 570,400, dated October 27, 1896.

Application filed November 21, 1895. Serial No. 569,639. (No model.)

*To all whom it may concern:*

Be it known that I, THOMAS HILL, of Jersey City, in the county of Hudson and State of New Jersey, have invented a new and Improved Cart, of which the following is a full, clear, and exact description.

The object of the invention is to provide a new and improved cart more especially designed for use in street-cleaning and arranged for conveniently collecting the street-sweepings and other refuse and delivering the same to a wagon or directly to the dump.

The invention consists principally of a cart-body provided with trunnions adapted to engage open bearings held on the cart-frame, mounted to swing in the side wheels as the fulcrum, the said trunnions being located above said fulcrum.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
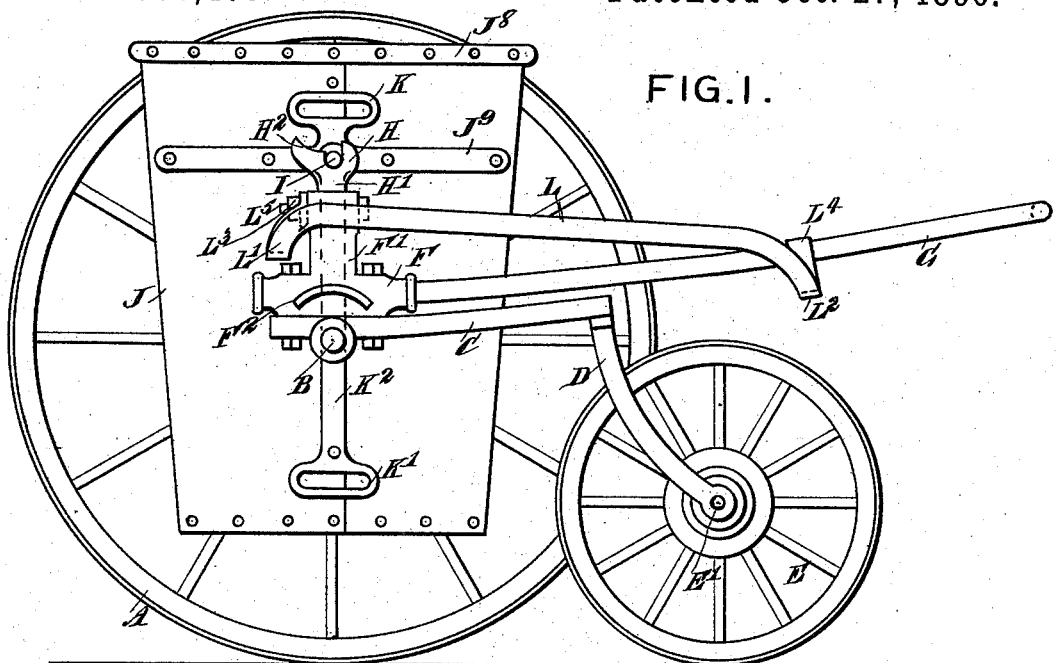
Figure 2:
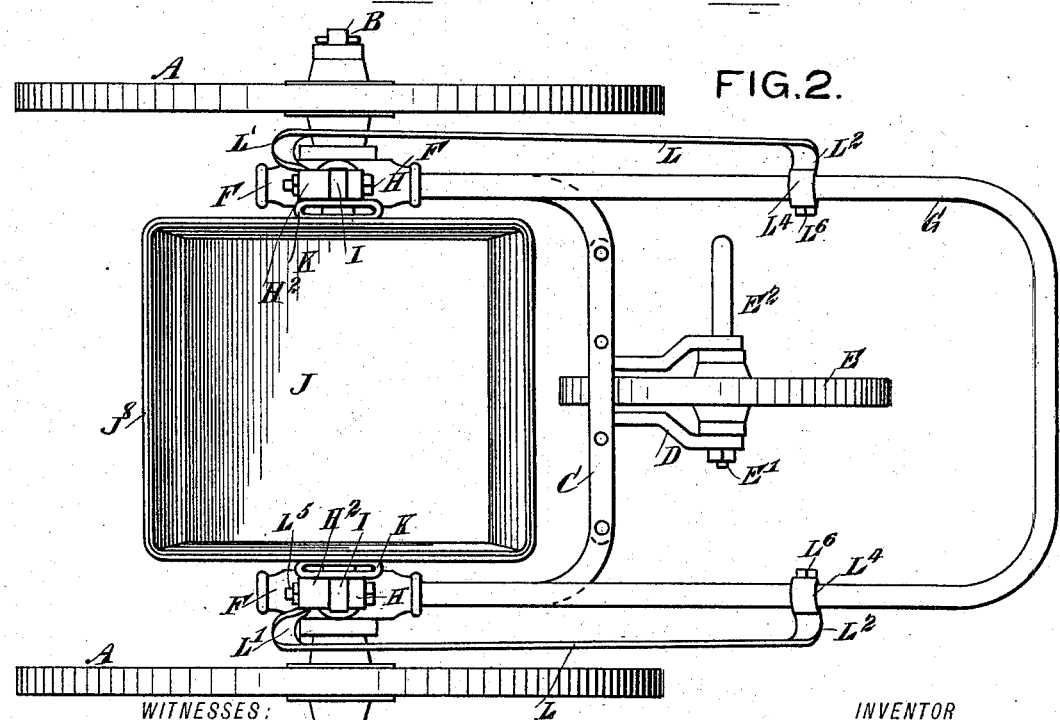
Figure 3:
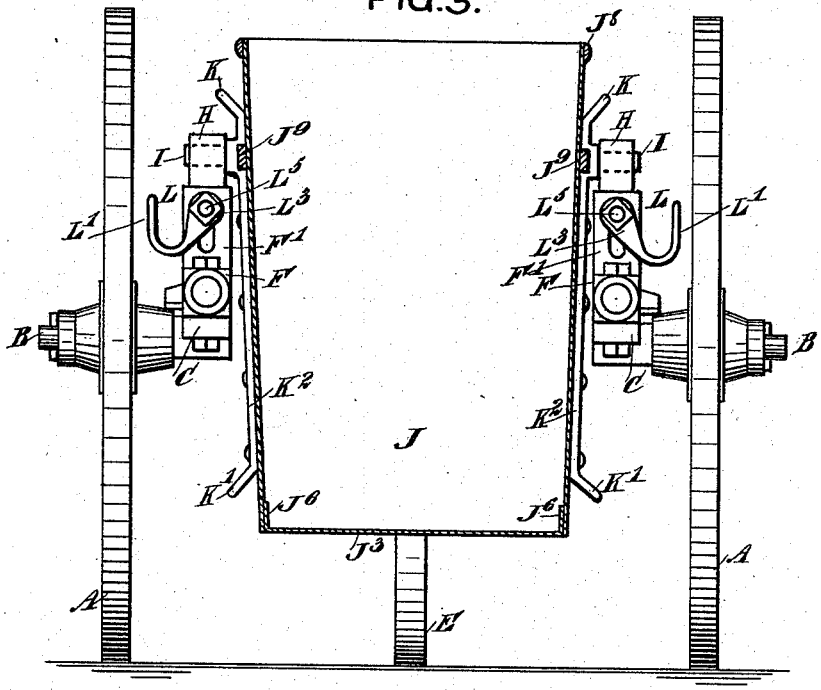
Figure 5:
Figure 4:
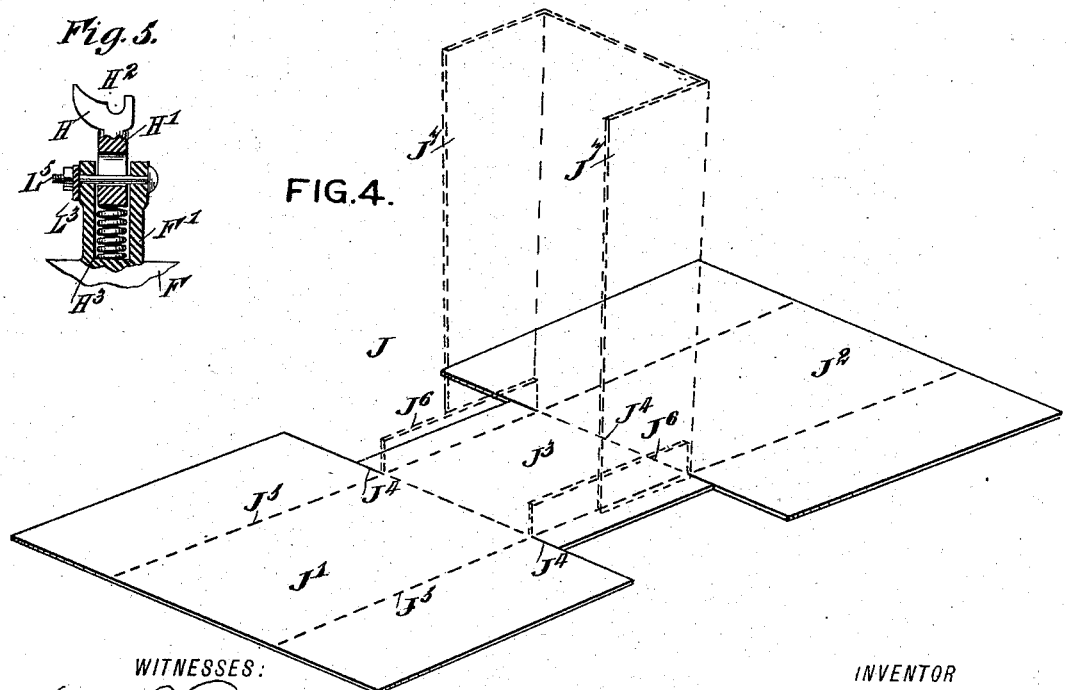

Figure 1 is a side elevation of the improvement. Fig. 2 is a plan view of the same. Fig. 3 is a transverse section of the same. Fig. 4 is a perspective view of the blank for forming the cart-body, and Fig. 5 is a broken sectional side elevation of one of the bearings for the cart-body.

The improved cart is provided with two side wheels A, mounted on the axles B, projecting from the ends of a U-shaped frame C, carrying at its middle a bracket D, in which is held the axle E' of the small guide-wheel E to hold the frame C normally in an approximately horizontal position, as indicated in Fig. 1.

On the frame C, directly above the axles B, is secured, by bolts or other means, a socket F, engaging the ends of a U-shaped handle G, extending with its sides above the sides of the frame C and having its middle portion extending a suitable distance to the rear of the wheel E to permit the operator to take hold of the said middle portion of the handle and draw the cart forward or backward without coming in contact with the said wheel E. The shaft E' of the wheel E is extended to one side to form a handle E², adapted to be taken hold of by one hand of the operator, having hold with his other hand on the middle portion of the handle G to conveniently swing the handle G upward, together with the frame C and wheel E, whenever it is desired and as hereinafter more fully explained, the frame turning on the axles B in the hubs of the wheels A as the fulcrum.

The sockets F are provided with vertical extension-sockets F', in which are fitted to slide the shanks H' of open bearings H, adapted to receive the trunnions I, projecting from the sides of the cart-body J, the said trunnions being located in the middle of the sides and near the upper ends thereof, as will be readily understood by reference to Fig. 1.

Now when the frame C is in its forward and approximately horizontal position, with the wheel E resting on the ground, then the trunnions I are situated vertically above the axles B, and the bottom of the body J is a suitable distance above the ground, and consequently the said cart-body J is hung freely in its bearings and can be tilted slightly forward or backward to permit the operator to conveniently pass the sweepings into the cart-body. The shanks H' of the bearings H are preferably set on springs H³, contained in the extension-sockets F', so that the said bearings, as well as the cart-body, are yieldingly mounted.

On each side of the cart-body J are arranged two handles K K', formed on the upper and lower ends of a bar K², riveted or otherwise secured to the sides of the cart-body. The handles K and K' extend obliquely from the side of the body and in opposite directions to one another, that is, the upper handle K extends upwardly and outwardly and the lower handle K' extends downwardly and outwardly, as will be readily understood by reference to Fig. 3. Thus, when the cart-body J is disconnected from the rest of the cart, the two operators, one on each side of the cart-body, can conveniently take hold of both handles K K' and lift the said body and dump the contents thereof into a wagon or other receptacle.

On each side of the cart is arranged a broom-holder L, formed of a single piece of metal and provided at its ends with downwardly-extending U-shaped bends L' L², adapted to receive the brush and handle of the broom. The bend L' is provided with a lug L³, fastened by a bolt L⁵ to the extension-socket F', and the other bend, L², is provided with a hook or sleeve L⁴, engaging the side of the handle G and secured thereon by a setscrew L⁶.

The cart-body J is preferably made of a single piece of sheet metal, and for this purpose the blank is made in the shape shown in Fig. 4, that is, is provided with the ends J' and J², and the connecting or bottom portion J³, narrower than the end pieces J' and J² and formed with leaves J⁴, extending from the inner sides of the end pieces J' and J² to the crease-lines J⁵, as indicated in Fig. 4. Now in order to form the box-body from this blank the sides and bottom piece are bent upward at the crease-line J⁵ to form the flanges J⁶, and then the end pieces J' and J² are bent upward at their inner ends and the sides of each end piece J' and J² are bent inward at right angles to form the sides J⁷ for the cart-body. The sides J⁷ of the two end pieces overlap and also abut against the flanges J⁶, so that the several parts can be riveted together to form a very strong and durable cart-body. The rim J⁸ is preferably riveted to the upper end of the body formed in the manner described, and strengthening-plates J⁹ are riveted to the sides of the body, as indicated in Figs. 1 and 3.

Now it will be seen that by the arrangement described the cart-body can be conveniently pushed by the operator, with the three wheels A and E traveling on the ground, from one place to another to receive the sweepings or other refuse. When it is desired to empty the cart-body J of its contents, the operator, by taking hold of the middle portion of the handle G with one hand and with the other hand on the extension-handle E², can swing the said handle, and consequently the frame C and wheel E, upward, whereby the trunnions I and body J are moved downward until finally the bottom of the body J rests on the ground. The handle G extends in an almost vertical position, and by the operator pulling rearwardly on the two handles K K' he moves the bearings H out from the trunnions I, so that the body J becomes disconnected from its bearings and remains stationary on the ground. The body J can then be taken hold of by the handles K K' and lifted and carried about and emptied of its contents either into a dump-wagon or into another receptacle serving as a dump.

When the body J has been emptied, it is again placed on the ground and the operator pushes the frame C forward, so as to finally engage the bearings H with the trunnions I, and then swings the frame C downward, so as to lift the body J and again support the same in a normal position. (Shown in Fig. 1.)

In order to permit of conveniently passing the bearings H out from the trunnions I or moving the trunnions I into the bearings, as above described, I form the front sides of the bearings with curved extensions H², as plainly shown in Fig. 1, to permit the trunnions to pass over the curved tops of the extensions into or out of the bearings.

Having thus fully described my invention, I claim as new and desire to secure by Letters Patent—

1. In a cart, a supporting-frame having horizontally-extended sockets, a handle having its ends engaged in said sockets, vertical sockets on the first-named sockets, and a broom-holder consisting of a single strip of metal having hook portions at its ends, one end of said metal strip being secured to a vertical socket and the other end to the handle, substantially as shown and described.

2. A cart-body formed of a single sheet of metal folded substantially as shown and described, vertical and horizontal strengthening-plates riveted on opposite sides of the body, and handles formed on the ends of the vertical plates, substantially as shown and described.

THOMAS HILL.

Witnesses:
JNO. M. RITTER,
F. W. HANAFORD.